NULL-BALANCE BRIDGE SYSTEM

Filed Feb. 25, 1959 2 Sheets-Sheet 1

3,085,194

NULL-BALANCE BRIDGE SYSTEM

George Revesz, Cheltenham, Pa., assignor to Robertshaw-Fulton Controls Company, Richmond, Va., a corporation of Delaware Filed Feb. 25, 1959, Ser. No. 795,378
5 Claims. (Cl. 323—75)

This invention relates generally to electrical bridge systems and more particularly to a null-balance bridge system which combines the advantages of an R.F. measuring bridge with the advantages of a low frequency null-balance servo system. A system of this general character has been disclosed and claimed in the copending application of Frederick L. Maltby et al., Serial No. 586,038, filed May 21, 1956, now Patent 2,962,641, and the present invention represents an improvement particularly applicable to this type of system.

That system utilizes an unmodulated carrier frequency signal and a low frequency modulated carrier frequency signal. The low frequency modulated carrier frequency signal is impressed upon an impedance bridge circuit which is unbalanced in response to a condition to be measured and/or controlled and appears at the output terminals thereof either as a signal in phase or out of phase with the unmodulated carrier frequency signal depending upon the direction of bridge unbalance. Means are provided to mix the unmodulated carrier frequency signal with the low frequency modulated carrier frequency signal appearing at the output terminals of the bridge circuit to produce a resultant mixed signal to be impressed upon a demodulator. A demodulator in turn demodulates the resultant mixed signal to derive a signal of the modulating low frequency which has been shifted in phase in accordance with the direction of bridge unbalance and which may be utilized to rebalance the bridge circuit or to initiate any desired measuring and/or controlling action.

Although a bridge system of this character performs in a manner far superior to that of prior art devices intended for similar usage, it has been observed that the bridge system has a tendency to produce erroneous signals at times when the bridge is in a condition of extreme unbalance, owing largely to the phase and amplitude relationship of the signals being mixed at this condition.

Accordingly, an object of this invention is to preclude the production of erroneous signals in a null-balance bridge system during conditions of extreme unbalance.

Another object of this invention is to limit the amplitude of an output signal derived from a bridge circuit to less than the amplitude of a signal with which the output signal is mixed.

A further object of this invention is to prevent phase shift of an unmodulated carrier frequency signal applied to the output terminals of a bridge circuit due to variations in the impedance of the bridge circuit.

A further object of this invention is to adjust the phase of an unmodulated carrier frequency signal relative to a modulated carrier frequency signal with which it is mixed.

A still further object of this invention is to improve the accuracy of a null-balance bridge circuit.

The preferred embodiment of this invention utilizes a source of unmodulated alternating voltage at a carrier frequency and a source of alternating voltage at a carrier frequency modulated with an alternating voltage of a relatively low frequency. The modulated alternating voltage is impressed upon an impedance bridge circuit which includes means in a branch thereof to unbalance the bridge circuit in response to the condition to be measured and/or controlled. Means are connected to receive the modulated alternating voltage appearing at the output of the bridge circuit and the unmodulated alternating voltage from the source and to derive from these voltages a resultant voltage of the relatively low frequency which is then utilized for suitable measuring and/or controlling action. Means are further provided to be connected to the output of said bridge circuit and to the source of unmodulated alternating voltage for limiting the peak-to-peak amplitude of the bridge circuit output voltage to less than the peak-to-peak amplitude of the unmodulated alternating voltage.

In another embodiment of this invention, additional means are provided at the source of unmodulated alternating voltage for adjusting the phase thereof relative to the phase of the unmodulated alternating voltage applied to the bridge circuit. Additional means are also provided for uncoupling the source of unmodulated alternating voltage from the bridge circuit to eliminate any undesirable phase shift in this voltage due to extreme variations in the impedance of the bridge circuit.

These and other objects and advantages of the present invention will become apparent by reference to the accompanying detailed description and drawing, in which like numerals indicate like parts, and in which.

Figures 3A, 3B, 3C:
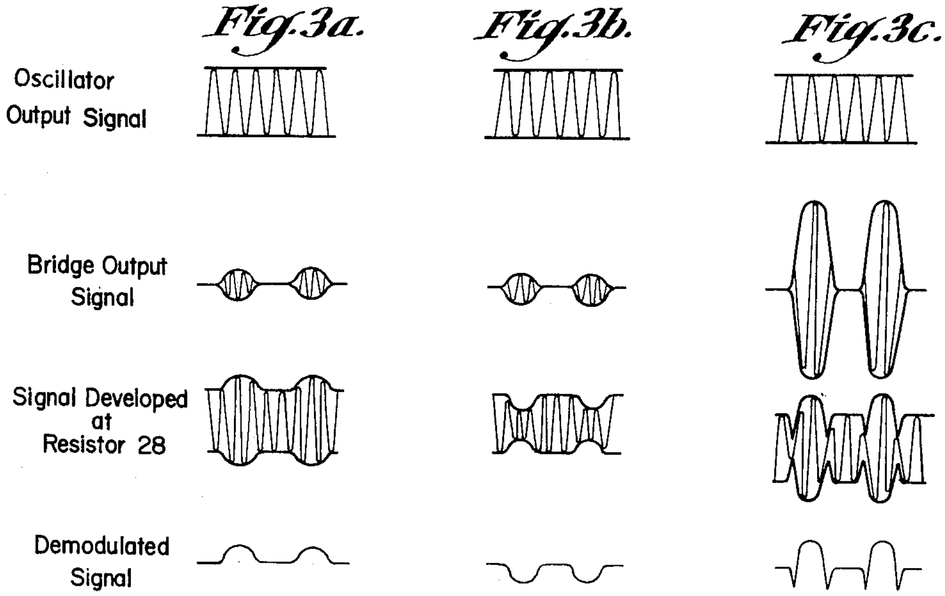

FIGS. 3*a*, 3*b*, and 3*c* are wave forms for points along the circuit of this invention.

Figure 1:
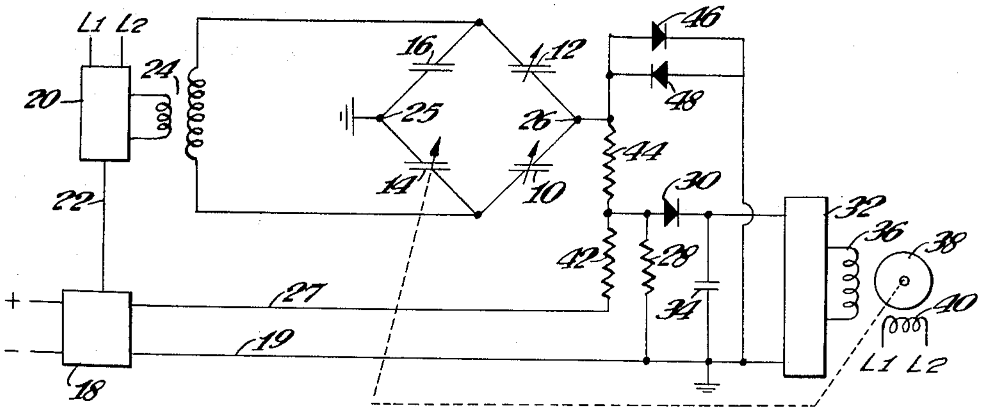
FIG. 1 shows diagrammatically one embodiment of the invention.

Referring more particularly to FIG. 1, the present invention utilizes an impedance bridge circuit comprising a plurality of impedance arms which, although not limited thereto, are shown as a plurality of capacitors 10, 12, 14, and 16. Capacitor 10 may be a capacity sensing element of any well known type which is variable in capacity in response to variations in a condition to be measured and may, for example, comprise a pair of spaced plates adapted to receive a variable moisture content dielectric therebetween. In such a sensing element, the capacitance varies with changes in the moisture content of the dielectric to unbalance the bridge circuit. The capacitors 12 and 14 may be of any well known construction and are preferably variable in capacitance so that they may be utilized to rebalance the bridge circuit and adjust the zero setting of the bridge circuit, respectively.

The impedance bridge circuit is preferably energized by a low frequency modulated carrier frequency signal which may be derived from a carrier frequency oscillator 18, shown to be energized from a suitable source of D.C. potential, and a low frequency modulator 20, shown connected to a suitable 60 cycle source of alternating current L1, L2. Oscillator 18 may have one output terminal grounded through wire 19 and is shown to have another output terminal connected to modulator 20 by a conductor 22. A portion of the oscillator output is thus amplified and modulated at a 60 cycle rate in the modulator 20 and thereafter applied to the input terminals of the bridge circuit through an R.F. transformer 24.

The output of the bridge circuit is derived at terminals 25 and 26, connected respectively to the junction intermediate capacitors 14 and 16 and the junction intermediate capacitors 10 and 12. Terminal 25 may conveniently be connected to ground. The output from oscillator 18 is further connected to output terminals 25 and 26 of the bridge circuit, as by wire 27 connected to terminal 26, for mixing a reference carrier frequency signal with the low frequency modulated carrier frequency signal appearing at the bridge output terminals during conditions of bridge unbalance.

The bridge output terminals 25 and 26 are further connected across a resistor 28 at which the reference unmodulated carrier frequency signal from oscillator 18 and the low frequency modulated carrier frequency signal from the impedance bridge are mixed and which has its ungrounded end connected to a diode element 30. The mixed signal appearing at resistor 28 is demodulated by diode element 30 and applied to the input terminals of an amplifier 32 which is responsive only to alternating current signals and which has one input terminal grounded and the other input terminal connected to diode element 30. A capacitor 34 may be connected across the input terminals of amplifier 32.

The signal impressed upon the input terminals of amplifier 32 during condition of bridge unbalance is a reproduction of the modulating low frequency signal which has been modified in phase and amplitude. This signal is amplified by the amplifier 32 and may be utilized for any suitable measuring and/or controlling action such as to energize the control winding 36 of a motor 38 which has a power winding 40 connected to a suitable source of alternating potential L1, L2. Motor 38 may suitably be a two phase motor of a well known type which will rotate in one direction or the opposite direction through an appropriate angle of rotation depending upon the phase and magnitude of the signal appearing at the output terminals of amplifier 32. Motor 38 is shown to be mechanically connected to the capacitor 14 and in this instance is utilized for manipulating the capacitor 14 to rebalance the bridge circuit in response to the output signal derived from amplifier 32.

In the circuit thus far described, it should be obvious that when the bridge circuit is balanced, only the unmodulated carrier frequency signal from the oscillator 18 is applied to diode element 30. This signal is demodulated to produce a D.C. signal for application to amplifier 32 and since amplifier 32 is chosen not to respond to a D.C. input, control winding 36 of motor 38 will not receive an input and, accordingly, the motor will not rotate. However, when capacitor 10 is varied to create a condition of unbalance in the bridge circuit, the low frequency modulated carrier frequency signal will appear at the bridge output terminals having a phase and amplitude relative to the phase and amplitude of the unmodulated carrier frequency signal which is determined by the degree and direction of bridge unbalance. FIG. 3*a* shows the signal produced at the bridge output terminals when the bridge is unbalanced in one direction, while FIG. 3*b* illustrates the signal produced when the bridge is unbalanced in the opposite direction. The signal at output terminals of the bridge is mixed with the unmodulated carrier frequency signal from oscillator 18 at resistor 28. After mixing of these signals at resistor 28, the mixed signal as shown in FIGS. 3*a* and 3*b* is demodulated by diode element 30 to provide a signal as shown in FIGS. 3*a* and 3*b* which is a signal of the modulating low frequency that is applied to winding 36 after having been amplified in amplifier 32. Motor 38 is in turn caused to rotate to rebalance the bridge circuit by appropriate manipulation of the capacitor 14.

For purposes of illustration, it is assumed that the modulated carrier frequency signal appearing at the output terminals of the bridge circuit will be in phase with the reference carrier frequency signal when the capacitance of capacitor 10 decreases in value from the value of capacitance at the balanced condition, and that the modulated carrier frequency signal appearing at the output terminals of the bridge circuit will be of opposite phase to that of the reference carrier frequency signal when the capacitance of capacitor 10 increases in value from the value of capacitance at the balanced condition. It is further assumed that in the in phase as well as in the out of phase condition that the amplitude of the modulated carrier frequency signal continuously increases with a continuous increase or decrease in the value of capacitance of capacitor 10 from the value of capacitance at the condition of bridge balance.

The accuracy of the system thus far described is determined largely by the mixed signal applied to diode element 30 for demodulation and, in turn, by the relative phase and amplitude relationship of the bridge output signal and the reference signal derived from oscillator 18. So long as there is no appreciable phase shift in the reference carrier frequency signal due to the loading of the bridge circuit and so long as the peak-to-peak amplitude of the bridge output signal is less than the peak-to-peak amplitude of the reference carrier frequency signal from the oscillator, the accuracy of the system is virtually unaffected.

However, there are situations where the capacitance of the bridge circuit may vary from just a few hundred micromicrofarads to as much as several thousand micromicrofarads to produce a substantial amount of phase shift in the reference carrier frequency signal. Moreover, in situations of extreme bridge unbalance and particularly when the signals to be mixed are out of phase, the bridge output signal may be of greater amplitude than the amplitude of the reference signal to produce, when mixed with the reference signal, a signal which has approximately the same modulation envelop as is produced by the mixing of the in phase signals and an amplitude which is completely unrelated to the actual amount of bridge unbalance. The wave forms shown in FIG. 3*c* illustrate the various signals that are produced as a result of such extreme bridge unbalance.

Obviously, the resultant mixed signals produced during these conditions of operation are undesirable in that they are clearly erroneous and unreliable. The adding circuitry comprising the resistors 42, 44 and the clipping circuit comprising diode elements 46, 48 is intended to eliminate the production of these erroneous signals.

Diode elements 46, 48 are oppositely poled and connected in parallel, with one common junction connected to the ungrounded output terminal of the impedance bridge circuit intermediate capacitors 10 and 12 and the other common junction connected to ground. Resistors 42 and 44 are connected in series between the ungrounded output terminal of the impedance bridge circuit and the ungrounded output terminal of oscillator 18. The common junction between resistors 42 and 44 is connected to the junction of diode element 30 and the ungrounded end of resistor 28.

The amplitude of the reference carrier signal to be mixed with the bridge output signal at resistor 28 is adjusted at the oscillator 18 and by the selection of the values of resistors 28, 42, and 44. Assuming for purposes of illustration that the reference carrier frequency signal appearing at resistor 28 has been adjusted to 2 volts peak-to-peak by the above adjustments, it is then desirable to maintain the bridge output signal at less than 2 volts peak-to-peak regardless of the degree and direction of bridge unbalance. With diode elements 46, 48 connected across bridge output terminals 25 and 26, it is apparent that they will affect the amplitude of the bridge output signal and may appropriately be chosen to conduct whenever the bridge output signal exceeds the amplitude of, for example, 2 volts peak-to-peak. Thus, so long as the amplitude of the bridge output signal is less than the amplitude of signal required to render diode elements 46 and 48 conductive, the clipping circuit will not appreciably attenuate the bridge output signal. However, when the amplitude of the bridge output signal exceeds 2 volts peak-to-peak, diode elements 46 and 48 will conduct to limit the bridge output signal to less than 2 volts peak-to-peak. The bridge output signal is thereafter attenuated by resistor 44 and applied therethrough to resistor 28 for mixing with the reference carrier frequency signal.

The reference carrier frequency signal from oscillator 18 is not clipped by diode elements 46 and 48 in that resistor 44 attenuates this signal to less than the 2 volts peak-to-peak which may be the preselected clipping voltage of diode elements 46 and 48. Any errors formerly introduced into the mixed signal due to extreme bridge unbalance is thus eliminated.

The following is a table of values which were used in one embodiment of this invention:

| Reference numeral: | Value |
|---|---|
| 28 | 47,000 ohms. |
| 30 | 1N34 diode. |
| 42 | 100,000 ohms. |
| 44 | 15,000 ohms. |
| 46 | 1N54 diode. |
| 48 | 1N54 diode. |

In the embodiment of FIG. 1, the resistor 44 to some extent functions to establish a limiting value for the loading of oscillator 18 and thereby to some extent prevents a marked phase shift in the reference carrier frequency signal upon wide variations in bridge capacitance. The adjustment of the phase of the reference carrier frequency signal relative to the phase of the output signal from the bridge circuit may be adjusted, in the embodiment of FIG. 1, by detuning the R.F. transformer 24, by means not shown. Detuning of the transformer 24, however, results in a reduction in the amplitude of the unmodulated carrier frequency signal applied to the bridge circuit and a consequential loss in overall system sensitivity.

Figure 2:
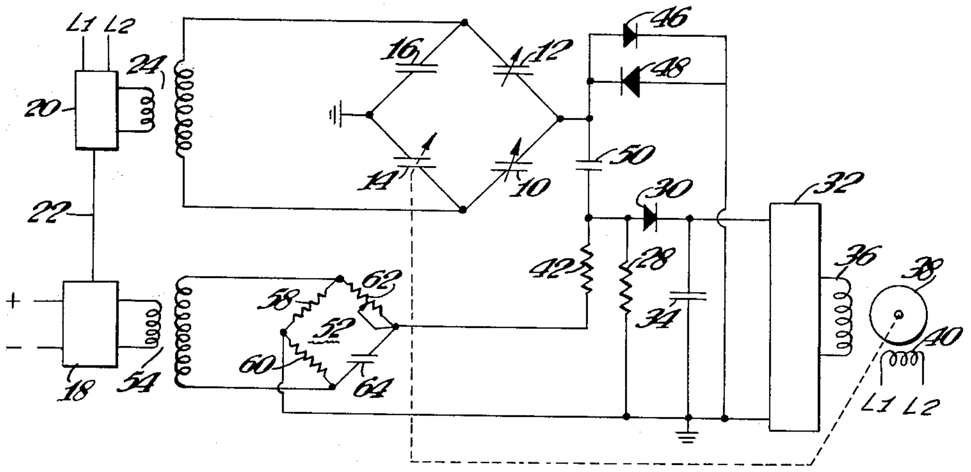
FIG. 2 is similar to FIG. 1 and shows another embodiment of this invention.

Circuitry is added to the embodiment of FIG. 2 to eliminate this loss of sensitivity and to eliminate the phase shift of the reference signal due to wide capacitance variations in the bridge circuit. This circuitry comprises a capacitor 50 substituted for the resistor 44 and a phase adjusting bridge circuit, indicated generally at 52, connecting the output of oscillator 18 to output terminals 25 and 26 of the impedance bridge circuit. An R.F. transformer 54 connects the phase adjusting bridge circuit 52 to oscillator 18 and has a primary winding connected to the output terminals of oscillator 18 and a secondary winding connected to the input terminals of a bridge circuit 52. Bridge circuit 52 is shown comprising resistors 58, 60, potentiometer 62 and capacitor 64 connected in series. The secondary of transformer 54 is connected to bridge circuit 52 at the junction intermediate resistor 58 and potentiometer 62 and at the junction intermediate resistor 60 and capacitor 64. The output of bridge circuit 52 appearing at the junction intermediate resistors 58 and 60 and the junction intermediate capacitor 64 and potentiometer 62 is applied to the bridge output terminals 25 and 26. To this end, the junction intermediate capacitor 64 and potentiometer 62 is connected directly to resistor 42 whereas the junction intermediate resistors 58 and 60 is connected directly to ground. The sliding contact on potentiometer 62 may be connected directly to the junction intermediate potentiometer 62 and capacitor 64.

As shown in FIG. 2, it should be apparent that when the value of resistance of resistors 58 and 60 is the same, that the capacitor 64 and potentiometer 62 will function to shift the phase of the signal applied to bridge circuit 52. Moreover, the signal applied to bridge circuit 52 may be adjusted in phase by movement of the sliding contact on potentiometer 62.

It should further be apparent, with the capacitor 50 connected in series with the impedance bridge circuit, that load variations as viewed by oscillator 18 may be kept to a minimum in spite of large capacitance variations in the impedance bridge circuit. For example, with the size of capacitor 50 selected to approach the minimum value of bridge capacitance, any subsequent sizeable increases in bridge capacitance will render the magnitude of the load as observed by oscillator 18 virtually unaffected. Thus, the phase shift of the reference signal due to variations in the capacitance of the bridge circuit is substantially eliminated.

The following is a table of values which were used in one embodiment of this invention wherein the impedance bridge circuit was variable in capacitance from 100 micromicrofarads to 5000 micromicrofarads:

| Reference numeral: | | Value |
|---|---|---|
| 50 | micromicrofarads | 25 |
| 58 | ohms | 5 |
| 60 | do | 5 |
| 62 | ohms, variable | 10,000 |
| 64 | micromicrofarads | 200 |

Through the use of the described circuitry, the maximum amplitude of the input signal to amplifier 32 is further determined to prevent any overloading of same without the necessity of the use of larger amplifiers than are actually required for the normal amplitude of the signal derived from demodulator 30. Accordingly, any sluggishness in the operation of the system which may have been present due to amplifier overloading is also eliminated.

While only two embodiments of the invention have been herein shown and described, it will be apparent to those skilled in the art that many modifications of the disclosed embodiments may be made without departing from the scope of the invention as defined by the appended claims.

I claim:

1. In a control device, the combination comprising a source of unmodulated alternating voltage at a carrier frequency, a source of low frequency modulated alternating voltage at a carrier frequency, a bridge circuit connected to said source of modulated voltage to provide a modulated voltage output having a phase and amplitude dependent on the bridge unbalance, means connected to receive said unmodulated alternating voltage and the output from said bridge circuit for deriving therefrom a resultant voltage of the modulating low frequency, and means connected to the output of said bridge circuit for limiting the amplitude of the bridge output voltage during unbalance to a maximum value less than the amplitude of said unmodulated alternating voltage, to prevent the resultant voltage from said deriving means from causing a reversal in phase of the bridge output.

2. In a control device, the combination comprising a source of unmodulated alternating voltage at a carrier frequency, a source of low frequency modulated alternating voltage at a carrier frequency, a bridge circuit connected to said source of modulated voltage to provide a modulated voltage output having a phase and amplitude dependent on the bridge unbalance, means for mixing said source of unmodulated alternating voltage with the output from said bridge circuit and for deriving therefrom an alternating voltage of the modulating low frequency, circuit means connecting the output of said bridge circuit and said source of unmodulated alternating voltage to said mixing means and including means for adjusting the phase of said source of unmodulated alternating voltage relative to the phase of said modulated alternating voltage, and asymmetrical conducting means connected across the output of said bridge circuit for limiting the bridge output voltage to a predetermined value, whereby the alternating voltage from said deriving means is in phase and amplitude indicative of the degree and direction of bridge unbalance.

3. In a control device, the combination comprising a source of unmodulated alternating voltage at a carrier frequency, a source of low frequency modulated alternating voltage at a carrier frequency, a bridge circuit connected to said source of modulated voltage to provide a modulated voltage output having a phase and amplitude dependent on the bridge unbalance, means for mixing said source of unmodulated alternating voltage with the output from said bridge circuit and for deriving therefrom an alternating voltage of the modulating low frequency, means including phase adjusting means connecting said source of unmodulated alternating voltage to said mixing means, and means including an impedance element connecting the output from said bridge circuit to said mixing means and for rendering said source of unmodulated alternating voltage insensitive to unbalance in said bridge circuit.

4. In a control device, the combination comprising a source of unmodulated alternating voltage at a carrier frequency, a source of low frequency modulated alternating voltage at a carrier frequency, a bridge circuit connected to said source of modulated voltage to provide a modulated voltage output having a phase and amplitude dependent on the bridge unbalance, means for mixing said source of unmodulated alternating voltage with the output from said bridge circuit and for deriving therefrom an alternating voltage of said modulating low frequency, and means connecting said source of unmodulated alternating voltage and the output from said bridge circuit to said mixing means and including means for adjusting the phase of said source of unmodulated alternating voltage relative to the phase of the output voltage from said bridge circuit.

5. In a control device, the combination comprising a source of unmodulated alternating voltage at a carrier frequency, a source of low frequency modulated alternating voltage at a carrier frequency, a bridge circuit connected to said source of modulated voltage to provide a modulated voltage output having a phase and amplitude dependent on the bridge unbalance, means including a pair of oppositely poled diode elements connected across the output of said bridge circuit for limiting the amplitude of the bridge output voltage, means for adjusting the phase of said source of unmodulated alternating voltage relative to the phase of said source of modulated alternating voltage, means including a serially connected resistor and capacitor connecting the source of unmodulated alternating voltage to the output of said circuit, and means connected to receive said source of unmodulated alternating voltage and the output from said bridge circuit appearing at the junction of said serially connected resistor and capacitor for mixing same and to derive therefrom an alternating voltage of the modulating low frequency which is in phase and amplitude indicative of the degree and direction of bridge unbalance.

References Cited in the file of this patent

UNITED STATES PATENTS

| | | |
|---|---|---|
| 2,501,583 | Schafer | Mar. 21, 1950 |
| 2,530,619 | Kliever | Nov. 21, 1950 |
| 2,852,680 | Radcliffe | Sept. 16, 1958 |
| 2,962,641 | Maltby | Nov. 29, 1960 |